United States Patent [19]

Cook

[11] Patent Number: 5,095,212

[45] Date of Patent: Mar. 10, 1992

[54] HIGH-EFFICIENCY PHOTON DETECTOR

[75] Inventor: Richard J. Cook, Colorado Springs, Colo.

[73] Assignee: The United States of America as represented by the Secretary of the Air Force, Washington, D.C.

[21] Appl. No.: 559,245

[22] Filed: Jul. 20, 1990

[51] Int. Cl.$^5$ ............................ G01J 1/58; H03F 7/00
[52] U.S. Cl. ................................ 250/458.1; 250/459.1; 359/326
[58] Field of Search .................... 250/458.1, 459.1; 307/425

[56] References Cited

U.S. PATENT DOCUMENTS

| | | | |
|---|---|---|---|
| 3,675,039 | 7/1972 | Boyd et al. | 307/425 |
| 3,795,819 | 3/1974 | Harris | 307/425 |
| 3,914,618 | 10/1975 | Harris | 307/425 |
| 4,592,064 | 5/1986 | Silfvast | 372/73 |
| 4,829,597 | 5/1989 | Gelbwachs | 250/458.1 X |

*Primary Examiner*—Vincent P. McGraw
*Attorney, Agent, or Firm*—Robert L. Nathans; Donald J. Singer

[57] ABSTRACT

High efficiency method of detecting incident photons including illuminating a laser driven gaseous vapor with electromagnetic radiation enabling the excitation of an atom of the vapor upon absorption of an incident photon by the atom, introducing the incident photons into the vapor which is constituted to absorb the incident photons which in response, generates atomic fluroescence to in turn produce a long steam of secondary photons upon the absorption of an incident photon by an atom of the vapor and detecting the long stream of secondary photons with an ordinary low efficiency photo-detector.

18 Claims, 1 Drawing Sheet

HIGH-EFFICIENCY PHOTON DETECTOR

STATEMENT OF GOVERNMENT INTEREST

The invention described herein may be manufactured and used by or for the Government for governmental purposes without the payment of any royalty thereon.

BACKGROUND OF THE INVENTION

This invention relates to the field of photodetectors.

Existing photon detectors, such as photoconductive detectors, photo tubes and photomultiplier tubes, have relatively low quantum efficiencies. At best, the quantum efficiency is of order 0.3. That is to say, these devices register a small fraction of the photons that fall on the sensitive surface of the detector. The most sensitive photon detectors currently available are photomultiplier tubes. For optimum wavelength and the best photosensitive surfaces, these devices can have quantum efficiencies as high as 0.3. But, for less than optimum conditions, the quantum efficiency is often much smaller. The quantum efficiency is the probability that a photon incident on the sensitive surface of the detector is registered by the detector. Thus the best available photon detectors register about one third of the photons that hit the detector surface. Other types of photon detectors, e.g., photoconductive solid-state devices, have quantum efficiencies substantially less than that of the photomultiplier tube.

Another disadvantage of the photomultiplier tube is its dark current. The dark current consists of a sequence of pulses that is generated by the tube when no light falls on its sensitive surface. The dark current is due to thermionic emission and other physical processes in the detector and associated electronics. The dark current is an unavoidable noise source because the dark-current pulses are indistinguishable from the pulses generated by the detector when photons are detected.

BRIEF SUMMARY OF THE INVENTION

It is a principal object of the present invention to provide a photon detector having a quantum efficiency very near to unity, perhaps 0.99, and which has low dark current noise. The high-efficiency photon detector uses an atomic amplification process in a laser-driven atomic vapor. When a photon of appropriate frequency enters a gas cell, the photon is absorbed, promoting a single atom from the ground state to an excited state. The excited state is the lower level of a laser-driven atomic transition which fluoresces strongly when populated by the absorption process. Thus the absorption of a single photon by the gas turns on a strong fluorescent signal which is easily detected with a conventional photon detector. When the upper and lower levels of the laser-driven transition have long lifetimes for radiative decay to the ground state, the fluorescence lasts a long time, and the gain of the atomic amplification process can be very high, perhaps greater than $10^8$. Because photons enter the gas and are absorbed with high probability, the detector has the aforesaid very high quantum efficiency. The detector also has very low noise because the strong fluorescence photon signals are easily discriminated from the detector noise pulses, which can therefore be eliminated from the signal electronically. The detector will be useful in any application that requires the detection of low light levels, such as satellite imagery, night vision, laboratory detection of weak photon signals, astronomical measurements, and so on.

There is published literature on how the absorption of a photon can turn off the fluorescence of a single laser-driven ion trapped in high vacuum: (1) H. Dehmelt, Bull. Am. Phys. Soc. 20, 60 (1975); and (2) R. J. Cook and H. J. Kimble, Phys. Rev. Lett. 54, 1023 (1985). The present invention uses a different energy level scheme which allows the absorption of a photon to turn on the atomic fluorescence, and the process works in an atomic vapor but would not work in an isolated trapped ion in ultrahigh vacuum.

BRIEF DESCRIPTION OF THE DRAWINGS

Other objects, features, and advantages of the present invention will become apparent upon study of the following description taken in conjunction with the drawing in which.

DETAILED DESCRIPTION OF PREFERRED EMBODIMENTS OF THE INVENTION

Figure 1:
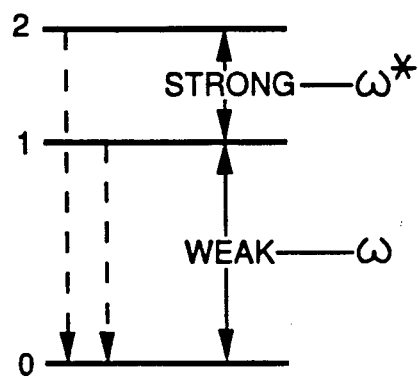
FIG. 1 illustrates an energy level diagram of detector atoms.

Consider a gas composed of atoms having an energy level structure depicted in FIG. 1. The upper transition, 1$\longleftrightarrow$2 is a strong electric-dipole transition with Bohr transition frequency $\omega^* = (E_2 - E_1)/n$. The lower transition, 0$\longleftrightarrow$1, is electric dipole forbidden and has transition frequency $\omega = (E_1 - E_0)/n$. If the excited state energies $E_1$ and $E_2$ are greater than, say, 2 eV above the ground state, then, at room temperature, the probability that even a single atom is excited in a cubic centimeter of the gas is very small. Only extremely rarely will an atom be thermally excited to level $E_1$ or $E_2$.

Let a strong laser beam of frequency $\omega^*$ illuminate the gas. Because there is no population in level 1 or level 2, the beam is neither absorbed nor scattered by the gas. That is, there is no atom in level 1 to absorb a photon of frequency $\omega^*$ and no atom in level 2 to spontaneously emit a photon of this frequency. But if a single photon of frequency $\omega$ enters the gas and is absorbed, the absorbing atom is promoted from the ground state to level 1. Under the action of the strong field at frequency $\omega^*$, the atom is then quickly promoted to level 2 by absorbing a photon of frequency $\omega^*$. From there the atom quickly returns to level 1 by spontaneous emission. The atom is now ready to absorb a second photon of frequency $\omega^*$, and the cycle of absorption and spontaneous emission repeats rapidly. This cycle is the resonance fluorescence cycle for the excited transition, and the stream of spontaneously emitted photons is the atomic fluorescence, or scattered radiation, at frequency $\omega^*$. When the transition 1$\longleftrightarrow$2 is saturated, the cycle of absorption and spontaneous emission repeats at the rate $A_{21}/2$ where $A_{21}$ is the Einstein spontaneous emission coefficient for this transition. For a "strong" electric-dipole transition, the fluorescence rate is typically $10^8$ photons/second. The above argument shows that, when the gas is illuminated with light of frequency $\omega^*$, and a single photon of frequency $\omega$ is absorbed by the gas, the absorbing atom begins to radiate strongly at frequency $\omega^*$. Single-atom fluorescence on a strong optical transition is not difficult to detect. Such fluorescence can be seen with the unaided eye, see W. Neuhauser, M. Hohenstatt, P. Toschek, and H. Dehmelt, Phys. Rev. Lett. 41, 233 (1978), Phys. Rev. A22, 1137 (1980). (2) Th. Sauter, W. Neuhauser, R. Blatt, and P. E. Toschek, Phys. Rev. Lett. 57, 1696 (1986)). A point source radiating $10^8$ photons per second is readily detected with a photomultiplier tube or with other types of photon detectors, provided a significant fraction of the photons are collected for detection. With a collection efficiency of 10%, the number of photons incident on the detector is of order $10^7$ per second.

The fluorescence emanating from the upper transition continues until the atom returns to the ground state by spontaneous emission from level 1 or level 2, as indicated by the dashed arrows in FIG. 1. We assume that the spontaneous emission rates from these levels to the ground state are small, so that the lifetime of the excited state manifold, the duration of the fluorescence of the upper transition is long, say one second. This implies that transitions 0⟵⟶1 and 0 ⟵⟶2 are weak. Magnetic-dipole or electric-quandrupole transitions would serve this purpose, but not electric-dipole transitions which, generally speaking, do not have lifetimes as long as one second; a lifetime of order one second is chosen here purely for the sake of argument. My detection method will work for any lifetimes that are long compared to the spontaneous decay time from level 2 to level 1.

To simplify the following argument, we suppose that level 2 decays only to level 1; this decay has the rate $A_{21} = 10^8 s^{-1}$ and level 1 spontaneously decays to the ground state at the rate $A_{10} = 2s^{-1}$. In this case, the duration of the upper state fluorescence, assuming transition 1⟵⟶2 is saturated, is one second. The average number of fluorescence photons emitted during this interval is $10^8$. Thus the absorption of a single photon of frequency $\omega$ gives rise to a fluorescence pulse at frequency $\omega^*$ containing $10^8$ photons and lasting, on average, a full second.

The high quantum efficiency of my detection method derives from the fact that the fluorescence pulse at frequency $\omega^*$ can be detected with certainty, whereas the original single photon at frequency $\omega$ would fail to be detected a good part of the time. In effect, the laser-driven gas amplifies the signal by a factor of $10^8$. That is to say, $10^8$ fluorescence photons are generated for each photon absorbed.

Figure 2:
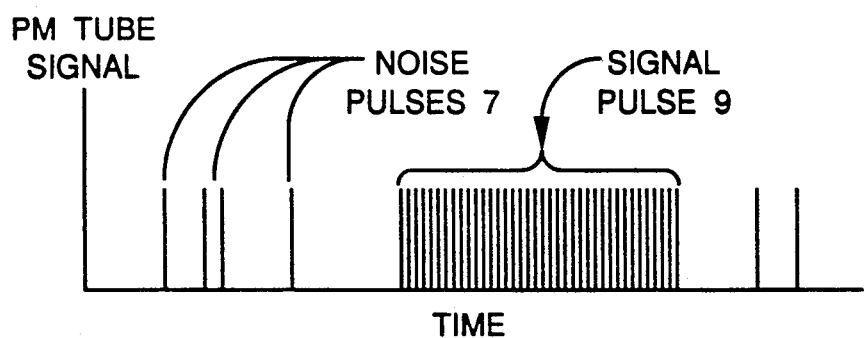
FIG. 2 illustrates signal and noise pulses produced by the photo-multiplier tube as a result of single-atom fluorescence.

The noise associated with this detection process can be very low. Of course, the detector used to register the fluorescence pulses will have a certain "noise current." For a cooled photomultiplier (PM) tube, there will be, say, 200 short noise pulses per second which occur at random times. When the PM tube is used to count photons directly, the noise pulses are indistinguishable from the pulses generated by photon detection events. For this reason the noise places a limit on the sensitivity of the detector. The noise must be included in the signal-to-noise calculation because it cannot be distinguished from the signal. On the other hand, in the detection method of the present invention, the signal pulse is long (1 second) and intense ($10^7$ photons/second). The difference between noise pulses and signal pulses for the case in which a PM tube is used to detect the atomic fluorescence is illustrated in FIG. 2.

The noise pulses 7 are short and infrequent (200/sec), whereas the signal pulse 9 generated by the fluorescence consists of a rapid succession of detector pulses ($10^6$/sec) for a detector with 10% quantum efficiency lasting for a long time, e.g., one second. Thus the signal pulses are easy to discriminate from the short noise pulses, by for example, a pulse width discrimator or detector 22. The probability that noise pulses combine to produce a long pulse that mimics a signal pulse is extremely small, and the discrimination of signal pulses from noise pulses is expected to be nearly perfect. After electronic discrimination and elimination of the noise pulses, the signal is essentially noise free.

Figure 3:
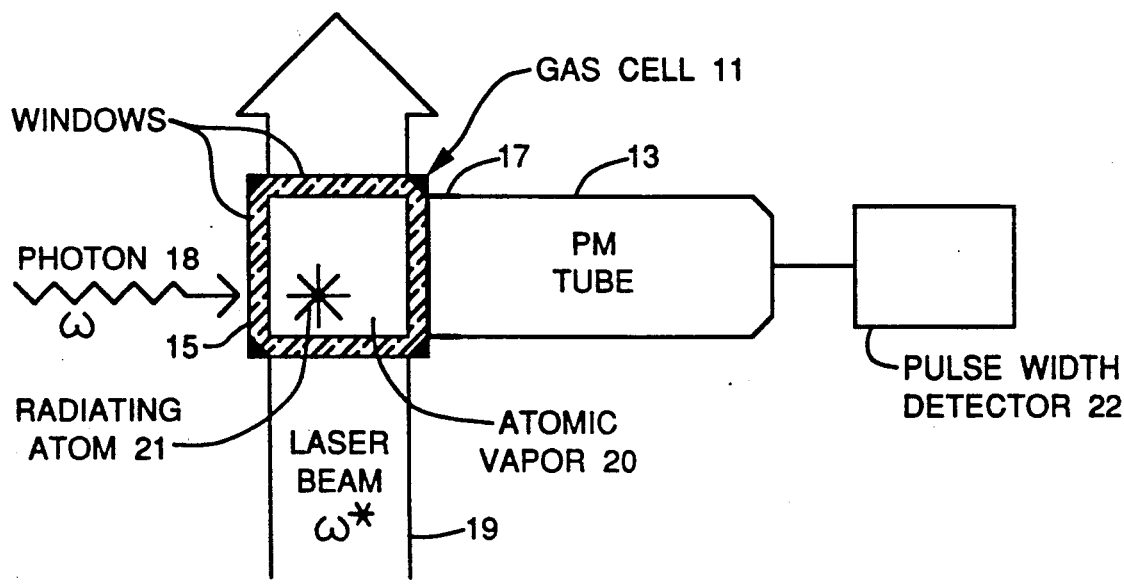
FIG. 3 illustrates an embodiment of the photon detector of the invention

It remains to be shown that the above principles can be applied in a detector of practical dimensions. A presently preferred detector design is illustrated schematically in FIG. 3, and is essentially a gas cell 11 affixed to the front end of an ordinary photomultiplier tube 13. The gas cell 11 has a window 15 on the front to allow photons 18 of frequency $\omega$ to enter the gas and a window 17 to allow the atomic fluorescence at frequency $\omega^*$ to enter PM tube 13. A laser beam 19 at frequency $\omega^*$ propagates through the gas illuminating the gas behind entrance window 15, which has an antireflection coating allowing photons of frequency $\omega$ to pass through with high probability. A high quality antireflection coating will pass photons with better than 99% probability. Once in the atomic vapor 20, the photon is absorbed by the gas. The probability density for the distance x that the photon travels into the atomic vapor before absorption is exponential (Beer's law):

$$W(x) = \alpha \exp(-\alpha x), \qquad (1)$$

where $\alpha$ is the absorption coefficient of the atomic vapor at frequency $\omega$. The photon 18 is absorbed with high probability in a distance that is several times the absorption length $s = 1/\alpha$. The absorption length on line center for a Doppler broadened line reads $$s = \frac{8\pi\tau_1}{3n\lambda^3} \sqrt{\frac{2\pi k_B T}{m}}$$

where
$\tau$ = Lifetime of level 1
n = Number density of atoms
$\lambda$ = Wavelength of radiation
$k_B$ = Boltzmann's constant
T = Absolute temperature
m = Mass of atoms For the following reasonable parameter values:
$\tau_1 = 2s$ (metastable state, very weak absorption line),
$n = 2.7 \times 10^{19} cm^{-3}$ (standard conditions),
$\lambda = 0.69$ microns (visible light, 2 eV),
T = 300K (room temperature),
m = 20 amu (light atom), the absorption length has the value $s - 1.6$ mm. This means that the photon is absorbed with better than 99% probability in a distance of 7.5 mm. This makes for a conveniently small detector, even for the weak absorption line considered here.

The analysis shows that an incident photon will enter the gas and be absorbed by the gas with high probability. Because the absorbing atom is in view of the photomultiplier tube, the resulting strong fluorescence pulse radiated by the atom 21 is detected by photomultiplier 13 with very high probability. The net result is that a photon of frequency $\omega$ that enters the front window of the detector is registered by PM tube 13 with near unit quantum efficiency.

In summary, the detection apparatus considered here is superior to existing detectors in that it has a quantum efficiency very near to unity, whereas presently available detectors are limited to quantum efficiencies of order 30%. The high quantum efficiency results from a single-atom amplification process that precedes detection with a conventional photon detector. The detector has very low noise. In existing detectors, the noise pulses are indistinguishable from signal pulses. For this reason the noise must be included in any signal analysis. In the method of the invention, the signal pulses are long and intense, and as a result, the signal pulses are easily discriminated from the short noise pulse and can be eliminated by well known electronic means, e.g. a pulse width detector 22 or leaky integrator, coupled to an adjustable threshold device. After discrimination and elimination of the noise pulses, the signal is essentially noise free.

Other variants of the aforesaid detector design may prove to be more practical or of wider utility.

Firstly, the atomic energy-level scheme need not be precisely that depicted in FIG. 1. Any of the transitions in the FIGURE may be replaced by a cascade through several atomic levels. The essential point is that the absorption of a single photon in some way promotes the atom to a manifold of states that radiate for an extended period of time when driven by a laser of appropriate frequency. The fluorescence need not be at the driving-laser frequency. For example, if the fast relaxation from level 2 to level 1 in FIG. 1 is replaced by a two-stage relaxation through an intermediate level, then either of the two radiated frequencies could be detected instead of the driving frequency $\omega^*$. The advantage of this type of detection is that any scattered radiation at the driving frequency $\omega^*$, which may be a substantial noise source, can be filtered out.

We have described a detector which operates at room temperature. For the detector to operate as described, the thermal population of excited states must be negligible. This requires that the excited states be about 2 eV, or a visible transition energy, above the ground state. If the excited states are of much lower energy, then, at room temperature, thermal population of the excited states will lead to signal pulses that are not produced by the absorption of photons. This would be a type of thermal noise. For the detection of less energetic photons, say infrared photons, the detector would have to be cooled. It is expected that the detection scheme will work as described until the atomic vapor condenses into a liquid. At that point various nonradiative decay processes come into play that may prevent detector operation. Although it is less likely, the detection scheme described here might operate successfully in the liquid or solid state. It is known, for example, that certain dye molecules in a boric acid glass matrix have very long excited state lifetimes. If there are any radiative rather than nonradiative transitions between these excited states, such a material would be a promising candidate for a photon detector. Similar statements can be made about other phosphorescent solid-state materials.

It should be emphasized that the one-second excited-state lifetime used as an example is not critical. Any radiation period that allows more than one fluorescence photon to be emitted gives rise to atomic amplification and improves the quantum efficiency of the PM tube 13. There are many atoms and molecules that have the required energy level configurations with radiative rates that will produce atomic amplification. It remains to be determined which are best suited in practice.

The aforesaid detector design makes use of a photomultiplier tube. This is not critical. When the gain of the atomic amplification process is high, almost any detector could be used to register the atomic fluorescence. A very small complete detector system might be possible by using a laser diode to drive the atomic vapor at frequency $\omega^*$ and a small solid-state photon detector to register the atomic fluorescence.

A disadvantage of the above described detector design results from the long signal pulses it generates. Because the signal pulses are long, they will overlap when the photon flux is high. That is, more than one atom in the atomic vapor will be fluorescing at a given time. When not too many atoms are fluorescing simultaneously, the number of overlapping signal pulses can be determined from a measurement of the signal level. This has already been demonstrated in ion trapping experiments. The difference in fluorescence intensity for one, two or three fluorescing atoms is not difficult to detect. When many atoms are fluorescing simultaneously, the number of overlapping signal pulses may be determined by using an image detector or CCD image sensor in place of the photomultiplier tube. The detector would image the atomic vapor, and would electronically count the number of point sources, and it would record the turning on and turning off of new atomic sources. In this way, each absorbed photon would be faithfully recorded. Such a recording method would make use of a vidicon or similar imaging detector or sensor. Although relatively strong photon fluxes might be handled in this way with good quantum efficiency, the detector is probably best suited for the detection of very weak photon beams.

Another disadvantage of the above described detector is that, at least for the initial design, it is sensitive only to certain discrete frequencies of light. Photons of frequency corresponding to the lower transition are detectable in the way described. In addition, photons with frequency corresponding to the transition from the ground state to level 2 are detectable in exactly the same manner. But photons of other frequencies will not be detected, or will be detected with very low quantum efficiency. An alternative detector design makes use of broad molecular bands rather than sharp atomic lines. This may allow broadband photon detection with near unit quantum efficiency. In molecules, rather than atoms, one can have energy level configurations similar to that of FIG. 1, but with the individual levels replaced by bands of energy levels. For dye molecules, in particular, one can also have the relaxation rates required for amplification, when the ground and excited states belong to the singlet and triplet manifolds, respectively. In liquids or solids there is usually a very fast nonradiative decay within each band which carries the molecule to the lowest level of the band. Thus the molecule will generally be found in the lowest level of the "ground band." From this singlet state there are weak transitions to excited triplet bands which decay very slowly back to the ground band. The important point is that we have, in this case, a broadband absorption rather than the line absorption of an atomic vapor. The absorption can be made to occur with high probability anywhere in the absorption band, and there are usually excited triplet transitions which can strongly absorb the pump radiation at frequency $\omega^*$, which could, in principle, drive the excited-transition fluorescence. The principal uncertainty with this method is whether molecules can be found that actually radiate on the excited transition rather than decay by some nonradiative process, which is the more usual case in liquids and solids. There are dye molecules for which excited transition fluorescence between triplet bands is known to occur. So the outlook for broadband photon detection with near unit quantum efficiency is good, but perhaps not as good as line detection with atomic vapors.

We calculate the probability that a single atom is thermally excited in a given volume of atomic vapor at room temperature. The thermal energy corresponding to room temperature is $$k_BT = 0.025 \text{ eV},$$

where $k_B(=1.38 \times 10^{-16} \text{ erg/K})$ is Boltzmann's constant and $T(=300K)$ is room temperature. Hence, if the excited states of an atom are at energies $E_n$ that are much farther above the ground state energy $(E_o=0)$ than 0.025 eV, then the ground state probability is very near unity and the small excited-state probabilities are given by the Boltzmann factor.

$$P_n = \exp(-E_n/k_BT).$$

With $E_n = 2$ eV, which corresponds to a transition from the ground state in the visible portion of the spectrum, the excited-state probability at room temperature is $P_n = \exp(-80) = 1.8 \times 10^{-35}$.

At standard temperature and pressure there is Avogadro's number of atoms $(N_0 = 6.02 \times 10^{23})$ in the molar volume $V_0 = 22.4 \times 10^3 \text{cm}^3$, or an atomic number density of $n = 2.7 \times 10^{19} \text{cm}^{-3}$. We conclude that the probability for a single atom to be excited to the level $E_n$ in one cubic centimeter of gas at room temperature is $p = nP_n = 5 \times 10^{-16}$. This probability is so small that it can safely be said that no atoms are excited under the stated conditions.

The high-efficiency photon detector can be based on a variety of atomic or molecular species. A lower transition in the visible portion of the spectrum was chosen for the disclosed example hereinabove, so that, at room temperature, there is essentially no population in the first excited state. If the detector atoms or molecules can be cooled to a low temperature, a detector transition with a much lower frequency (to detect a lower energy photon) can be used. By cooling, a detector of the type described herein can be used to detect infrared radiation, microwave radiation or even radio frequency photons. This inventor knows of no other way to detect individual radio frequency or microwave photons. Conventional detectors, such as photomultipliers and solid-state detectors, cannot detect such long wavelength radiation as individual quanta. The detector transition for these wavelengths would be the ground-state rotational transitions in molecules or the ground-state hyperfine transitions in atoms. There is a variety of atoms with hyperfine levels that could be used in this way.

Information about the energy levels and transition rates of atoms that might serve as detector atoms may be found in many professional journals. Such journals that contain the required data are: Physical Review A, The Journal of the Applied Optics Society of America, and the IEEE Journal of Quantum Electrons. Spectroscopic data may also be found compiled in a number of National Bureau of Standard publications. Generally speaking, a search of the literature may be required to locate a suitable detector atom or molecules for a given spectral range. As one specific example, the helium atom could be used as a detector for ultraviolet radiation with the fluorescence transition being in the visible. Other examples include the other noble gases where a disallowed transition from the ground state carries the atom to a strongly fluoressing allowed transition between states that are metastable against transitions to the ground state—the so-called "metastable noble gases."

An essential property of detector atoms or molecules is that the upper transition be at a wavelength that can be detected with existing detectors (photomultipliers or solid-state detectors). This probably means a transition in the ultraviolet, visible or near infrared. For longer wavelengths (lower energy transitions) the flourescence rate is probably too small for the detector to work efficiently. For example, a flourescence transition in the microwave or radio range would probably not be practical at present because the fluorescence rate for these long wavelengths is negligibly small.

While there has been described what is at present considered to be the preferred embodiments of this invention, it will be obvious to those skilled in the art that various changes and modifications may be made therein without departing from the invention and it is, therefore, intended in the appended claims to cover all such changes and modifications as fall within the true spirit and scope of the invention, including art recognized equivalents.

What is claimed is:

1. Method of detecting incident photons comprising the steps of:
   (a) illuminating a substance with electromagnetic radiation enabling the excitation of an atom of said substance upon absorption of an incident photon by said atom;
   (b) introducing said incident photons into said substance constituted to absorb said incident photons and which in response thereto generates atomic fluorescence, which in turn produces long streams of secondary photons upon the absorption of incident photons by atoms of said substance; and
   (c) detecting said long streams of secondary photons produced in accordance with step (b).

2. The method of claim 1 wherein each incident photon directed into said substance has a first frequency which promotes an atom of said substance from a ground state to an excited state at a lower level of an atomic transition and wherein the lower level and an upper level of said atomic transition have long lifetimes for radiative decay to the ground state, thereby to produce substantial atomic photon amplification.

3. The method of claim 1 wherein an ordinary photon detector is provided for detecting said long streams of secondary photons.

4. The method of claim 2 wherein an ordinary photon detector is provided for detecting said long stream of secondary photons.

5. The method of claim 2, or 4 where step (a) includes illuminating said substance with electromagnetic radiation of a second frequency which promotes said atom to an upper level by absorbing a first photon of said electromagnetic radiation of a second frequency, is quickly returned to a lower level by spontaneous emission, which again quickly promotes said atom to said upper level by absorption of a second photon of said electromagnetic radiation of a second frequency and so forth during the production of said long stream of photons.

6. The method of claim 1, 2, 3, or 4 wherein said substance is a gaseous vapor.

7. The method of claims 1, 2, 3 or 4 wherein an image sensor is provided for counting the number of atoms of said substance simultaneously emitting said long streams of photons.

8. The method of claim 5 wherein an image sensor is provided for counting the number of atoms of said substance simultaneously emitting said long streams of photons.

9. The method of claim 6 wherein an image sensor is provided for counting the number of atoms of said substance simultaneously emitting said long stream of photons.

10. Apparatus for detecting incident photons comprising:
    (a) means for illuminating a substance with electromagnetic radiation enabling the excitation of an atom of said substance upon absorption of an incident photon by said atom;
    (b) means for introducing said incident photons into said substance which is constituted to absorb said incident photons and which in response thereto generates atomic fluorescence which in turn produces a long stream of secondary photons upon the absorption of an incident photon by an atom of said substance; and
    (c) a detector for detecting said long stream of secondary photons.

11. The apparatus of claim 10 wherein each incident photon directed into said substance has a first frequency which promotes an atom of said substance from a ground state to an excited state at a lower level of an atomic transition and wherein the lower level and an upper level of said atomic transition have long lifetimes for radiative decay to the ground state, thereby to produce substantial atomic photon amplification.

12. The apparatus of claim 10 wherein said detector is ordinary photon detector for detecting said long stream of secondary photons.

13. The apparatus of claim 11 wherein an ordinary photon detector is provided for detecting said long stream of secondary photons.

14. The apparatus of claims 11, or 13 wherein the means of paragraph (a) includes means for illuminating said substance with electromagnetic radiation of a second frequency which promotes said atom to an upper level by absorbing a first photon is quickly returned to a lower level by spontaneous emission, which again quickly promotes said atom to said upper level by absorption of a second photon, and so forth during the production of said long stream of photons.

15. The apparatus of claim 10, 11, 12, or 13 wherein said substance is a gaseous vapor.

16. The apparatus of claims 10, 11, 12, or 13 including an image sensor for counting the number of atoms of said substance simultaneously emitting said long stream of photons.

17. The apparatus of claim 14 including an image sensor for counting the number of atoms of said substance simultaneously emitting said long stream of photons.

18. The apparatus of claim 15 including an image sensor for counting the number of atoms of said substance simultaneously emitting said long stream of photons.

* * * * *